(12) United States Patent
Abdulhalim

(10) Patent No.: US 8,369,014 B2
(45) Date of Patent: Feb. 5, 2013

(54) POLARIZATION INDEPENDENT BIREFRINGENT TUNABLE FILTERS

(75) Inventor: Ibrahim Abdulhalim, Neve Shalom (IL)

(73) Assignee: Ben-Gurion University of the Negev—Research and Development Authority, Beer Sheva (IL)

( * ) Notice: Subject to any disclaimer, the term of this patent is extended or adjusted under 35 U.S.C. 154(b) by 609 days.

(21) Appl. No.: 12/477,953

(22) Filed: Jun. 4, 2009

(65) Prior Publication Data
US 2009/0284708 A1  Nov. 19, 2009

Related U.S. Application Data

(63) Continuation-in-part of application No. PCT/IL2007/001497, filed on Dec. 4, 2007.

(60) Provisional application No. 60/872,492, filed on Dec. 4, 2006.

(51) Int. Cl.
*G02B 5/30* (2006.01)

(52) U.S. Cl. ............... 359/489.06; 359/489.19

(58) Field of Classification Search ............ None
See application file for complete search history.

(56) References Cited

U.S. PATENT DOCUMENTS

| | | | |
|---|---|---|---|
| 4,505,550 A | 3/1985 | Steinbruegge | |
| 5,111,321 A | 5/1992 | Patel | |
| 5,321,539 A | 6/1994 | Hirabayashi et al. | |
| 5,710,655 A | 1/1998 | Rumbaugh et al. | |
| 5,781,268 A | 7/1998 | Liu et al. | |
| 6,081,367 A | 6/2000 | Yokoyama et al. | |
| 6,141,069 A * | 10/2000 | Sharp et al. | 349/98 |
| 6,522,467 B1 | 2/2003 | Li et al. | |
| 7,009,680 B2 | 3/2006 | Cavanaugh et al. | |
| 7,167,230 B2 * | 1/2007 | Klaus et al. | 349/202 |
| 2002/0171935 A1 | 11/2002 | Cormack | |

FOREIGN PATENT DOCUMENTS
EP  1326127 A2  7/2003

OTHER PUBLICATIONS

"Omnidirectional reflection from periodic anisotropic stack," I. Abdulhalim, Opt. Commun., vol. 174, pp. 43-50 (2000).
"Selective Reflection by Helicoidal Liquid Crystals . . . " I. Abdulhalim, J. de Phys. vol. 46, p. 815 (1985).
"Bi:x Y3-x Fe5 O12 thin films prepared by laser ablation . . . " M.Laulajainen et al, Journal of Magnetism & Magnetic Materials, vol. 279, Issues 2-3, pp. 218-223, Aug. 2004.
"Polarization conversion from diffraction gratings" S.J. Elston et al, Phys. Rev. B., vol. 44, pp. 6393-6400 (1991).
"Broadband polarization-converting mirror . . . " I.R. Hooper et al, Opt. Lett., vol. 27, pp. 2152-2154 (2002).
"Reflection grating as polarization converters" R.A. Watts et al, Opt. Commun. vol. 140, pp. 179-183 (1997). International Search Report and Written Opinion of the Int'l Searching Authority for PCT/IL07/01497 (WO 2008/068753), mailed Mar. 24, 2009.

* cited by examiner

*Primary Examiner* — Derek S Chapel
(74) *Attorney, Agent, or Firm* — Daniel Feigelson

(57) ABSTRACT

Novel, polarization-insensitive, birefringent, broadband tunable filter arrangements that allow high throughput, based on a combination of tunable birefringent layers or polarization dependent filters, in combination with one or more of the following components (i) thin film achromatic quarter waveplates based on the form birefringence of dielectric subwavelength grating structures, (ii) nano wire-grid polarizers made of metallic wire grids; (iii) omnidirectional dielectric mirrors, (iv) polarization conversion mirrors, (v) reflective polarized beam splitters for circularly polarized light, (vi) metallic sub-wavelength gratings with lines having Gaussian profile, and (vii) Faraday mirror. All of these components may be implemented in thin film form on one or more substrates, such that a compact and cost effective filter can be produced. The birefringent layers can be any birefringent or magneto-optic layer but especially liquid crystals. The use of novel polarization conversion disposition of the components of the filter results in a filter having high throughput.

9 Claims, 13 Drawing Sheets

POLARIZATION INDEPENDENT BIREFRINGENT TUNABLE FILTERS

CROSS-REFERENCE TO RELATED APPLICATIONS

This application claims priority from and is a continuation-in-part of International Patent Application Ser. No. PCT/IL2007/001497, filed Dec. 4, 2007, which claims priority from U.S. provisional application Ser. No. 60/872,492, filed Dec. 4, 2006, from which the present application also claims priority. The disclosures of both of these applications are incorporated herein by reference.

FIELD OF THE INVENTION

The present invention relates to the field of tunable optical filters based on birefringence interference effects, and especially those adapted to be polarization independent.

BACKGROUND OF THE INVENTION

The use of optical fibers in telecommunication networks is an established technology. Tunable optical filters having a high tuning speed, a wide tuning range and of low cost are required to utilize this technology effectively.

Polarization-sensitivity is a general characteristic of many optical filters and represents a serious limitation for use in telecommunication applications, since transmission of light down an optical fiber generally results in severe polarization mixing due to the nature of the physical changes in the conditions down the fiber, such as bending, temperature, stress and other factors. Therefore, the lack of polarization independence in filtering applications in optical fibers, for example in wavelength division multiplexing WDM, where input polarization is unknown and generally uncontrollable, is a serious problem.

For arbitrary polarized input, an optical filter typically decomposes the polarization into two components, one of which interacts with the ordinary index of refraction $n_o$, and the other of which interacts with the extra-ordinary index of refraction $n_e$. In such cases, the filter transmits two peaks, one associated with each polarization component. If a polarizer is used to eliminate the unwanted resonant peak, such as that arising from the ordinary wave, for arbitrary input polarization from a fiber, up to half of the input power may be lost.

A number of prior art patents have addressed the issue of polarization independence in optical components, and especially in filters, some of them relying on the use of polarization diversity at the component input. Among such prior art patents are U.S. Pat. No. 6,522,467 to Li, et. al., for "Polarization insensitive liquid crystal tunable filter"; U.S. Pat. No. 5,781,268 to Liu, et. al., for "Polarization-insensitive Fabry-Perot tunable filter"; U.S. Pat. No. 6,081,367 to Yokoyama, et. al., for "Optical filter module and optical amplifier using the same"; U.S. Pat. No. 5,710,655 to Rumbaugh, et. al., for "Cavity thickness compensated etalon filter"; U.S. Pat. No. 5,321,539 to Hirabayashi, et. al., for "Liquid crystal Fabry-Perot etalon with glass spacer"; and U.S. Pat. No. 5,111,321 to Patel, for "Dual-polarization liquid crystal etalon filter".

Some of the solutions presented are considered to be bulky or complex to construct, or have non-negligible insertion losses, such that there still exists a need for polarization insensitive, compact, broadband optical filter components having high optical throughput.

The disclosures of each of the publications mentioned in this section and in other sections of the specification, are hereby incorporated by reference, each in its entirety.

SUMMARY OF THE INVENTION

The present invention seeks to provide new polarization insensitive birefringent tunable filters (PIBTFs) that allow high throughput and are broadband, preferably based on a combination of one or more of the following components:

(i) Achromatic quarter wave plates (AQWP) made of a single tunable retarder, or for passive filters, made of several retarders, or in thin film form based on the form birefringence of dielectric subwavelength grating structures. For use as a QWP, the grating structure should have an effective form birefringence $\Delta n_{eff}$ and height h satisfying the condition $\Delta n_{eff} = \lambda/4h$, to satisfy the quarter wave condition.

(ii) Nano wire-grid polarizers made of metallic wire grids or an alternating stack of birefringent and isotropic layers. The birefringent layers can preferably be based on the form birefringence of subwavelength dielectric gratings.

(iii) Omnidirectional dielectric mirrors for high throughput and operated near the edge of their photonic band gap for polarization conversion.

(iv) Polarization conversion mirrors.

(v) Reflective polarized beam splitters for circularly polarized light.

(vi) Tunable birefringent layers, in any of their common configurations. The birefringent layers can be any birefringent or magneto-optic layer but special consideration is given to the use of liquid crystals. The tunability will be used to maintain their polarization conversion action over a wide spectrum of wavelengths.

(vii) Metallic subwavelength gratings in thin film form deposited on substrate.

Since one of the main limitations of tunable birefringent filters is the light throughput, due to the large number of polarizers, the incorporation of polarizers with high transparency, preferably of greater than 90% over the whole spectral range, is a distinct advantage. According to preferred embodiments of the present invention, there are therefore provided a number of preferred types of reflective polarizers that act as polarization beam splitters (PBS's) and that can be manufactured in thin film form, or as nano-structures, using lithography and thin film deposition techniques. Additionally and preferably, there is further provided, the use of achromatic waveplates, combined with a standard mirror, for polarization conversion, omnidirectional mirrors for high throughput, polarization conversion mirrors and polarized beam splitters for circularly polarized light, all produced in thin film form on one or more substrates, such that a particularly compact and cost effective filter can be produced.

There exist commercially available liquid crystal tunable filters (LCTF's) such as those produced by Cambridge Research Instruments Inc. of Woburn, Mass., USA and Scientific Solutions Inc. of North Chelmsford, Mass., USA, but which exhibit low light transmission, generally of up to 40%, and which are polarization dependent.

According to preferred embodiments of the present invention, a number of novel birefringent optical filter configurations are proposed. Different embodiments are based on stacks of birefringent plates in combination with at least one of:

(i) planar polarized beam splitters (PBSs) preferably made of a stack of dielectric thin films and dielectric subwavelength gratings, such as wire grid polarizers (WGP or WGPBS) which can be manufactured with existing silicon technology, or in combination with birefringent etalons and cavities made of the same birefringent material;

(ii) omnidirectional mirrors (ODR), used to provide high throughput over a wide angular and spectral range, and to act as polarization conversion mirrors when operated near the edge of their photonic band gap;

(iii) achromatic quarter waveplates (AQWP's), for providing broadband use and polarization insensitivity, either by using tunable LC QWP's, or by using a combination of several retarders or by using a thin film layer of subwavelength dielectric grating (SWDG). SWDG's act as negative uniaxial plates and can be designed as waveplates in the visible or above. Based on the special dispersive behavior of the effective form birefringence, AQWP's or SWDG-AQWP combinations can be produced in planar form using thin film technology. The addition of the nano-patterned grating type polarized beam splitters allow for compact design and low cost in volume production. By using a novel arrangement of WGPBS's and birefringent stacks, high efficiency, polarization independent optical filters are provided with possible operation in reflection or transmission modes.

The addition of a birefringent etalon to the filter allows the achievement of narrower peaks with a smaller number of components compared to the case of using the filter without the etalon, thus improving the light throughput and minimizing the cost. The optical arrangements proposed for converting light of arbitrary polarization to linearly polarized light, enables filters with higher light throughput to be obtained than that generally available with prior art tunable birefringent interference filters.

These novel embodiments, all aimed at improving the transmission and eliminating polarization dependence, thus allow for tunable optical filtering with several advantages:
(i) Compactness due to the use of nano-structured thin films.
(ii) Low cost in volume production due to the possible integration of thin films and nano-structures using optical lithography techniques.
(iii) Narrow bandwidth with small number of components using tunable birefringent retarders and etalons.
(iv) Easy integration into imaging and illumination systems for the purpose of multi-spectral imaging applications in quality control, machine vision and biomedicine.
(v) Polarization insensitivity and high light throughput.

There is thus provided in accordance with a preferred embodiment of the present invention, a polarization independent tunable optical filter comprising:
(i) first and second polarization conversion mirrors, and
(ii) a tunable birefringent layer disposed between the polarization conversion mirrors, wherein the first polarization conversion mirror reflects incident light of a first linear polarization direction as light converted to a second linear polarization direction essentially perpendicular to the first linear polarization direction, and the second polarization conversion mirror reflects incident light of the second linear polarization direction as light converted to the first linear polarization direction, and wherein the polarization conversion mirrors comprise thin film structures.

In the above described filter, the polarization conversion mirrors are preferably aligned to form a Fabry-Perot cavity between them. The tunable birefringent layer may preferably be a liquid crystal layer.

Additionally, in these filters, at least one of the polarization conversion mirrors may preferably comprise either:
(i) a stack of anisotropic birefringent layers based on the form birefringence of subwavelength dielectric gratings, or
(ii) an array of subwavelength metallic gratings with Gaussian-type line profile and their ridges slanted at 45 degrees with respect to the polarization axis of normally incident light, or
(iii) an array of subwavelength gratings deposited on a mirror and having effective form birefringence $\Delta n_{eff}$ and height h satisfying the condition $\Delta n_{eff} = \lambda/14h$, where $\lambda$ is the central wavelength of the range of operation, or
(iv) an array of subwavelength gratings deposited on a mirror and having form birefringence dispersion that allows achromatic operation over a wide spectral range.
(v) a Faraday mirror in thin film form, which rotates the plane of polarization of incident linear polarization by 45 degrees and then an additional 45 degrees upon reflection, resulting in 90 degrees rotation.

In accordance with still another preferred embodiment of the present invention, in the above-described filters, the polarization conversion mirrors may preferably comprise helical chiral smectic liquid crystal structures aligned such that the light impinges thereon at an oblique angle, such that the reflection therefrom is at the second order reflection peak. Alternatively and preferably, the polarization conversion mirrors comprise a solid helical chiral sculptured thin film structure aligned such that the light impinges thereon at an oblique angle, such that the reflection therefrom is at the second order reflection peak.

There is further provided in accordance with still another preferred embodiment of the present invention, a method of filtering an optical beam having arbitrary polarization, comprising:
(i) inputting the beam to a polarization conversion assembly, such that the part of the input beam having a first linear polarization is transmitted therethrough, and another part of the input beam having a second linear polarization, orthogonal to the first linear polarization, is reflected therefrom with circular polarization,
(ii) disposing a planar reflector to return the circularly polarized beam back towards the polarization conversion assembly, the planar reflector reversing the helicity of the circular polarization, such that when the circularly polarized beam impinges on the polarization conversion assembly, it is transmitted therethrough with the first linear polarization, and
(iii) directing all of the beam having the first linear polarization after transmission through the polarization conversion assembly to a birefringent tuned filter, aligned such that it provides optimum throughput to a beam having the first linear polarization.

In this method, the polarization conversion assembly may preferably comprise a quarter wave plate in juxtaposition to a polarization beam splitter, or a polarized beam splitter for circularly polarized light in juxtaposition to a quarter wave plate. The polarization conversion assembly may be preferably constructed in planar form on a single substrate.

According to any of the above described methods, the birefringent tuned filter may preferably be a liquid crystal tuned filter.

There is even further provided in accordance with another preferred embodiment of the present invention, a polarization independent tunable optical filter comprising:
(i) a birefringent tuned filter element, and
(ii) an input beam processing module, the module comprising:
a quarter wave plate,
a planar polarization beam splitter disposed in juxtaposition to the quarter wave plate, and between the quarter wave plate and the birefringent tuned filter element, and
a reflective surface disposed such that it reflects light returned from the polarization beam splitter and through the quarter wave plate back, with reversed polarization rotation, towards the quarter wave plate and polarization beam splitter.

In the above described filter, the planar polarization beam splitter may preferably be a wire-grid polarization beam splitter. Additionally, the quarter wave plate and the planar polarization beam splitter may preferably be constructed on a single substrate, which could be a glass, quartz or silicon substrate.

Furthermore, in these above-described filters, the quarter wave plate may preferably be any one of a liquid crystal tuned quarter wave plate, a passive achromatic quarter wave plate comprising a plurality of retarders or a passive achromatic quarter wave plate utilizing the form birefringence dispersion properties of sub-wavelength dielectric grating layers, and additionally, in any of the filters, the birefringent tuned filter element may preferably be a liquid crystal tuned filter.

There is also provided in accordance with a further preferred embodiment of the present invention, a polarization independent tunable optical filter comprising:
(i) a birefringent tuned filter element, and
(ii) an input beam polarization processing module, adapted to input light to the filter element, the processing module comprising:
a planar polarization beam splitter for circular polarization,
a quarter wave plate disposed in juxtaposition to the planar polarization beam splitter for circular polarization, and between the polarization beam splitter for circular polarization and the birefringent tuned filter element, and
a reflective surface disposed such that it reflects light returned from the polarization beam splitter back, with reversed polarization rotation, towards the polarization beam splitter and quarter wave plate.

In this above described filter, the planar polarization beam splitter for circular polarization may preferably be either a cholesteric or chiral smectic liquid crystal, or a sculptured thin film. Additionally, the quarter wave plate and the planar polarization beam splitter for circular polarization may preferably be constructed on a single substrate, which could be a glass, quartz or silicon substrate. In accordance with yet more preferred embodiments of the present invention, in these filters the quarter wave plate may be any one of a liquid crystal tuned quarter wave plate, a passive achromatic quarter wave plate comprising a plurality of retarders, or a passive achromatic quarter wave plate utilizing the form birefringence dispersion properties of sub-wavelength dielectric grating layers. Additionally, the birefringent tuned filter element may preferably be a liquid crystal tuned filter.

There is further provided in accordance with yet another preferred embodiment of the present invention, a polarization independent tunable optical filter comprising:
(i) a birefringent tuned filter element, and
(ii) an input beam polarization processing module adapted to input light to the filter element, the processing module comprising:
a polarizing beam splitter,
a first polarization conversion mirror receiving light of a first linear polarization transmitted by the PBS, and returning the light to the PBS converted to a second linear polarization orthogonal to the first linear polarization,
a polarization maintaining reflector receiving light of the second linear polarization reflected by the PBS, and returning the light of the second linear polarization to the PBS, and
a second polarization conversion mirror, receiving light of the second linear polarization from the polarization maintaining reflector after reflection in the PBS, and returning the light to the PBS converted to the first linear polarization, such that it is transmitted by the PBS to the first polarization conversion mirror, and returned to the PBS as the second linear polarization,
wherein all of the light of the second linear polarization is input to the filter element.

In such a filter, the polarization maintaining reflector can preferably be either a corner prism or a retroreflector. Additionally, at least one of the polarization conversion mirrors may preferably comprise an achromatic quarter wave plate and a mirror, which, according to further preferred embodiments of this invention, may preferably be planar devices constructed on a common substrate.

In accordance with still another preferred embodiment of the present invention, there is further provided a polarization independent tunable optical filter comprising:
(i) a polarization beam splitter providing from an input beam of light, separate beams having first and second orthogonal linear polarizations,
(ii) a stack of identical birefringent retarder plates, the optical axes of successive retarder plates being alternately aligned at an equal angle either side of a predetermined reference direction in the plane of the plates, and
(iii) a polarization beam combiner for combining the separate beams after traversing the stack,
wherein each of the beams traverses the stack through spatially distinct regions of the retarder plates. In such a filter, at least some of the birefringent retarder plates preferably comprise a liquid crystal, which itself may preferably be tuned by means of an applied electric field. In general, in such a filter, the birefringence may preferably be varied by changing the externally applied conditions of the birefringent retarder plates, such that the filter is tuned in accordance with the externally applied conditions.

There is further provided in accordance with still another preferred embodiment of the present invention, a polarization independent tunable optical filter comprising:
(i) a polarization beam splitter providing from an input beam of light, separate beams having first and second orthogonal linear polarizations,
(ii) a stack of identical birefringent retarder plates, the optical axes of successive retarder plates being alternately aligned at an equal angle either side of a predetermined reference direction in the plane of the plates, and
(iii) a polarization conversion mirror for reflecting the output beams back through the stack with reversed polarization,
wherein each of the beams traverses the stack through spatially distinct regions of the retarder plates.

In this above described filter, the polarization conversion mirror may preferably comprise an achromatic quarter wave plate and a mirror, which themselves could preferably be planar devices constructed on a common substrate. Furthermore, in such a filter, at least some of the birefringent retarder plates preferably comprise a liquid crystal, which itself may preferably be tuned by means of an applied electric field. In general, in such a filter, the birefringence may preferably be varied by changing the externally applied conditions of the birefringent retarder plates, such that the filter is tuned in accordance with the externally applied conditions.

In accordance with a further preferred embodiment of the present invention, there is also provided a polarization independent tunable optical filter comprising:
(i) a polarization beam splitter providing from an input beam of light, separate beams having first and second orthogonal linear polarizations,
(ii) a stack comprising birefringent retarder plates, the retarder plates being pixilated such that each of the separate beams traverses a separate pixel, and
(iii) a polarization beam combiner for combining the separate beams after traversing the stack,
wherein each of the pixels of the retarder plates is adjusted such that the output peak from each of the beams occurs at the same wavelength. The stack comprising birefringent retarder plates may preferably be arranged in either a fan Solc filter or a Lyot-Ohmann filter configuration. Furthermore, in such a filter, at least some of the birefringent retarder plates preferably comprise a liquid crystal, which itself may preferably be tuned by means of an applied electric field. In general, in such a filter, the birefringence may preferably be varied by changing the externally applied conditions of the birefringent retarder plates, such that the filter is tuned in accordance with the externally applied conditions.

There is even further provided in accordance with another preferred embodiment of the present invention, a polarization independent tunable optical filter comprising:

(i) a polarization beam splitter providing from an input beam of light, separate beams having first and second orthogonal linear polarizations,
(ii) a stack comprising birefringent retarder plates,
(iii) a half wave plate disposed in the path of each of the beams, one before traverse of the stack, and the other after traverse of the stack, and
(iv) a polarization beam combiner for combining the separate beams after traversing the stack, wherein each of the beams traverses the stack through spatially distinct regions of the retarder plates.

In such a filter, the stack comprising birefringent retarder plates may preferably be arranged in either a fan Solc filter or a Lyot-Ohmann filter configuration. In either of these embodiments, the half wave plates may be disposed in different beams. Furthermore, in such a filter, at least some of the birefringent retarder plates preferably comprise a liquid crystal, which itself may preferably be tuned by means of an applied electric field. In general, in such a filter, the birefringence may preferably be varied by changing the externally applied conditions of the birefringent retarder plates, such that the filter is tuned in accordance with the externally applied conditions.

BRIEF DESCRIPTION OF THE DRAWINGS

The present invention will be understood and appreciated more fully from the following detailed description, taken in conjunction with the drawings in which:

FIG. 6A shows a subwavelength grating structure fabricated on a mirror substrate from dielectric wire grids;

FIG. 6B shows an alternating isotropic and birefringent thin film planar polarized beam splitter, in which the birefringent layer is a sub-wavelength dielectric grating structure, possessing large form birefringence;

FIG. 6C shows a schematic drawing of an omnidirectional mirror structure;

FIG. 6D shows a schematic drawing of a tunable polarization conversion mirror using LC layer with thickness and birefringence satisfying the QWP condition;

FIG. 12A utilizes a polarization conversion mirror, while FIG. 12B uses a Sagnac-type interferometer path design for its reflective embodiment;

DETAILED DESCRIPTION OF PREFERRED EMBODIMENTS

Figure 1:
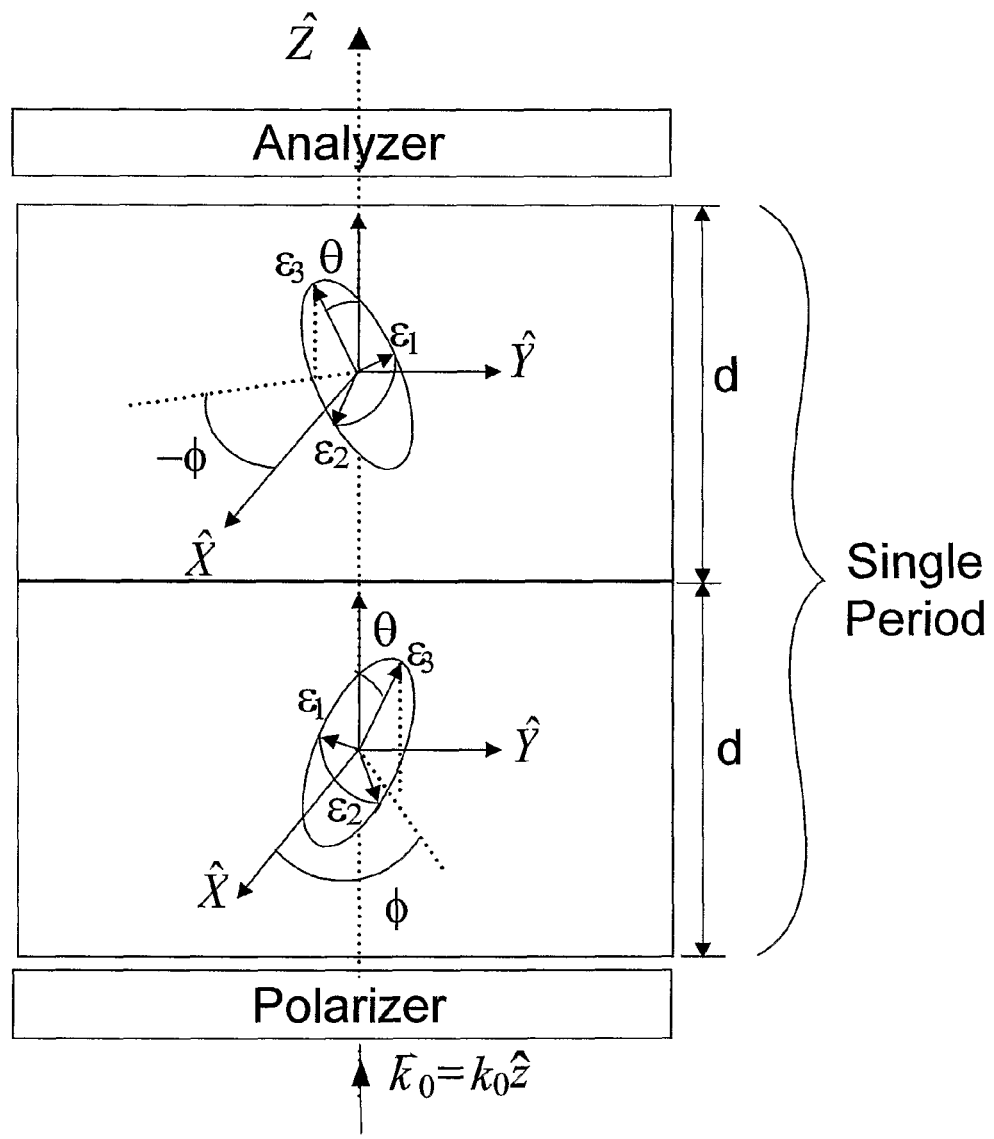
FIG. 1 shows a schematic drawing of a filter element comprising at least one birefringent layer sandwiched between polarizing layers.
Figures 2A, 2B:
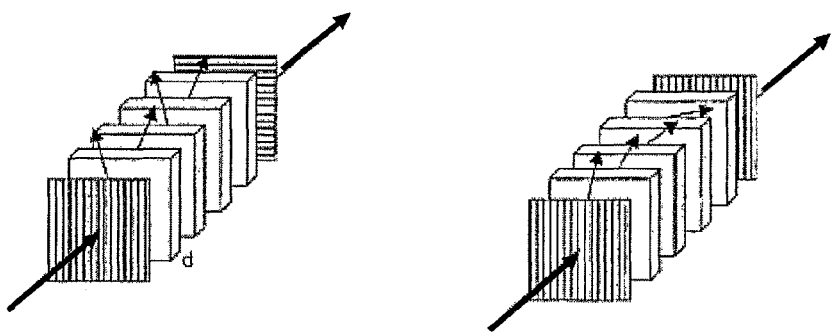
FIGS. 2A and 2B are schematic drawings of classical Solc filters comprising a series of identical birefringent plates arranged between two polarizers, FIG. 2A showing the folded Solc filter configuration, and FIG. 2B the fan Solc filter configuration.
Figure 3:
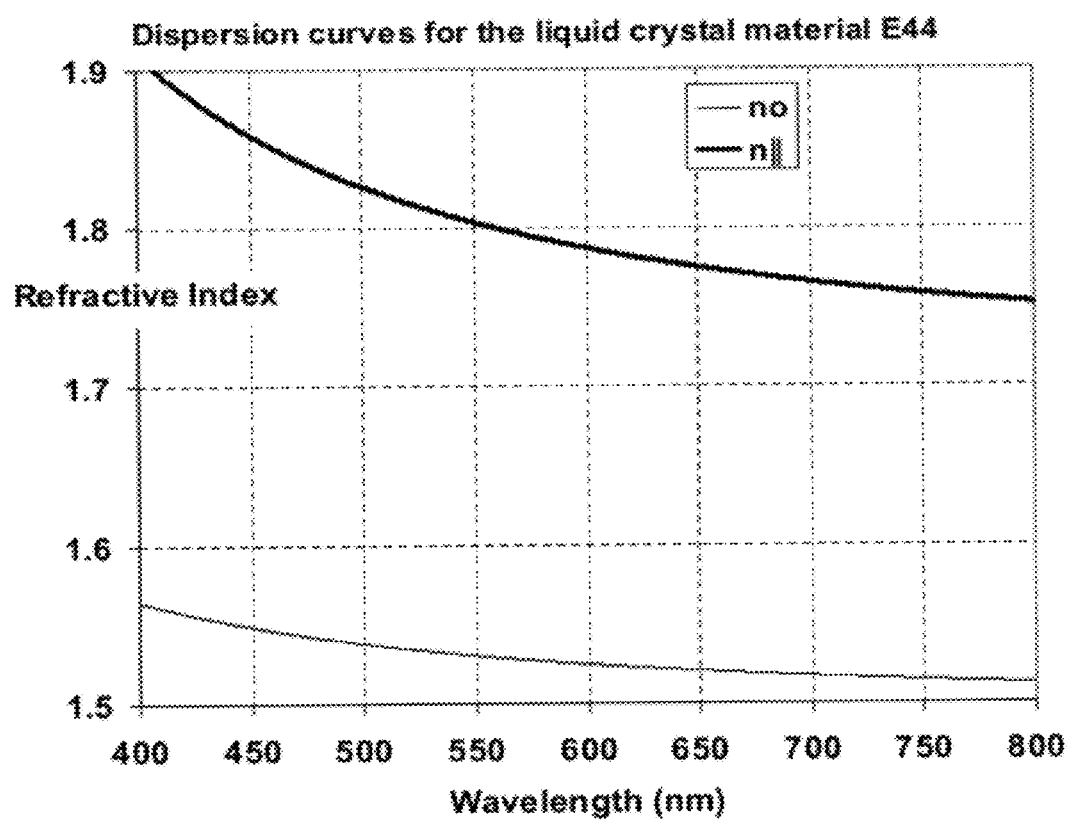
FIG. 3 is a graph showing the dispersion curves for a birefringent material, liquid crystal E44, such as can be used in the filters of the various embodiments of the present invention.

Reference is now made to FIGS. 1 to 5, which illustrate schematically preferred prior art embodiments of birefringent tunable filter elements which make up the core of the novel tunable filters of the present invention. The filter elements generally comprise at least one birefringent layer, having an ordinary refractive index $n_o$ which is almost constant with voltage or temperature, and an extraordinary refractive index, $n_e$ which varies with voltage or temperature, sandwiched between polarizing layers, as shown in FIG. 1. Liquid crystals are convenient birefringent materials because of the ease of control of the alignment of the birefraction effect with an applied electric field. FIG. 3 shows the dispersion curves for such a birefringent material, liquid crystal E44, obtainable from Merck of Hawthorne, N.Y., USA. The difference in phase retardation between different polarizations as a function of wavelength during passage through a layer of such a birefringent material leads to an interference effect, resulting in a wavelength filtering of the layer. The effect can be tuned by application of an electric field across the liquid crystal.

Narrower tuning or filtering effect is obtained by use of a stack of such birefringent layers, and several sophisticated stack designs have been in use since the first half of the twentieth century. Reference is now made to FIGS. 2A and 2B which are schematic drawings of Solc filters. These filters comprise a series of identical birefringent plates or retarders 40, arranged between two polarizers 41, 42. There are two types of Solc configurations, the folded and the fan configurations. In the classical folded Solc filter (FoS) shown schematically in FIG. 2A, the optical axis of each successive retarder 40 in the stack, rocks back and forth at angles of $\pm\alpha$. In the classical fan Solc filter (FaS) shown schematically in FIG. 2B, the optical axis of each successive retarder 44 in the stack rotates by a fixed angle $\alpha$, such that successive plates are aligned at angles $\alpha$, $2\alpha$, $3\alpha$, $4\alpha$, etc. The two configurations also differ structurally in that in the FoS filter, the polarizers 41, 42 are crossed, with polarization conversion taking place during transmission through the filter, while in the FaS filter, the polarizers 45, 46 are aligned parallel, with no polarization conversion taking place during transmission through the filter. This difference will have an effect on the embodiments of the filters of the present invention to be described hereinbelow.

Figures 4A, 4B:
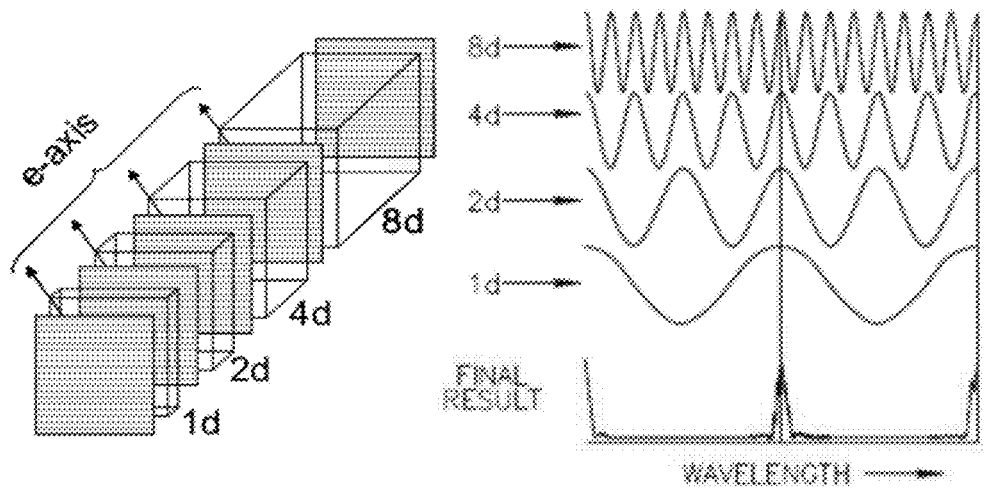
FIG. 4A is a schematic drawing of a Lyot-Ohmann (L-O) filter configuration, and FIG. 4B are graphs showing the optical output from each stage, and the final filter output.

Reference is now made to FIG. 4A, which is a schematic drawing of a Lyot-Ohmann (L-O) filter, in which each stage of the filter comprises a birefringent layer 60 between parallel polarizers 61, 62, the thickness of each successive layer in the stack increasing in a geometric relationship. The optical output from each stage, and the final filter output are shown in FIG. 4B. Like the FaS filter of FIG. 2B, the L-O filter has parallel polarizers, and therefore no polarization conversion is generated in passage therethrough.

Figure 5:
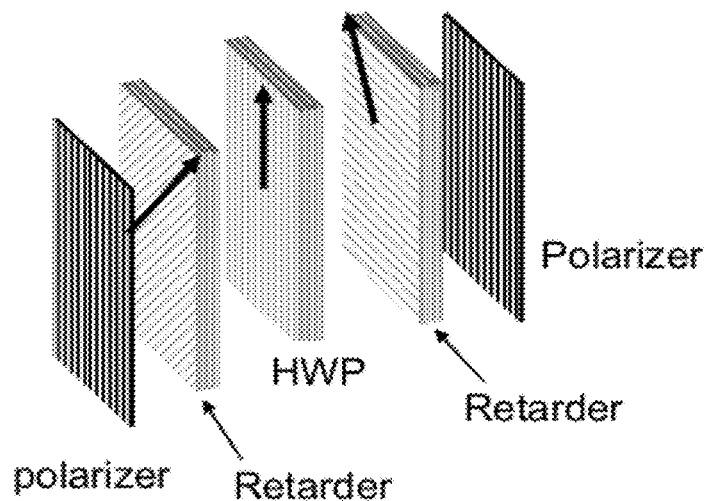
FIG. 5 is a schematic drawing of a wide-field Lyot-Evans (WFLE) filter element configuration.

Reference is now made to FIG. 5, which is a schematic drawing of a wide-field Lyot-Evans (WFLE) filter element, which differs from the L-O filter in that the retarder located between the parallel polarizers 75, 75, is split in half, and the first half 71 and second half 72 are aligned at 90 degrees to each other. In addition an achromatic half wave plate HWP 73 is inserted between these two halves. The HWP is oriented such that its optic axis is parallel to the polarizers' axis. The phase retardation becomes less sensitive to the angle of incidence for this filter, and the angular field of view is thus increased significantly.

Figure 7:
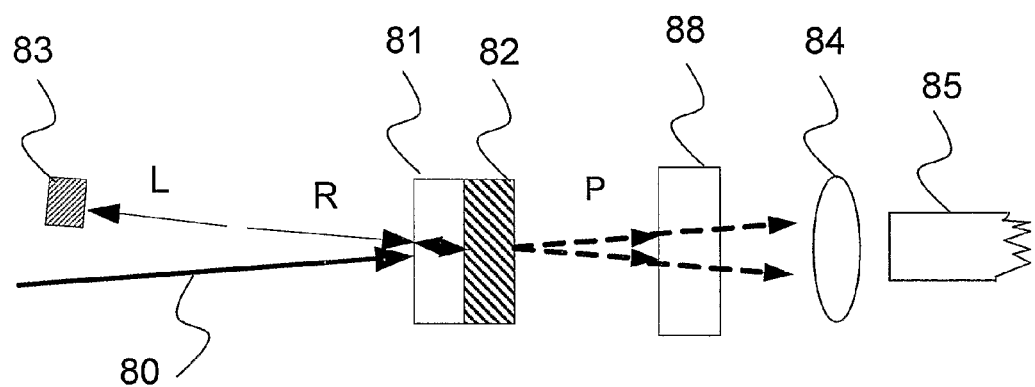
FIG. 7 illustrates a polarization insensitive tunable filter (PITF) with broadband, arbitrary-to-linear polarization conversion, constructed and operative according to a first preferred embodiment of the present invention.
Figure 8:
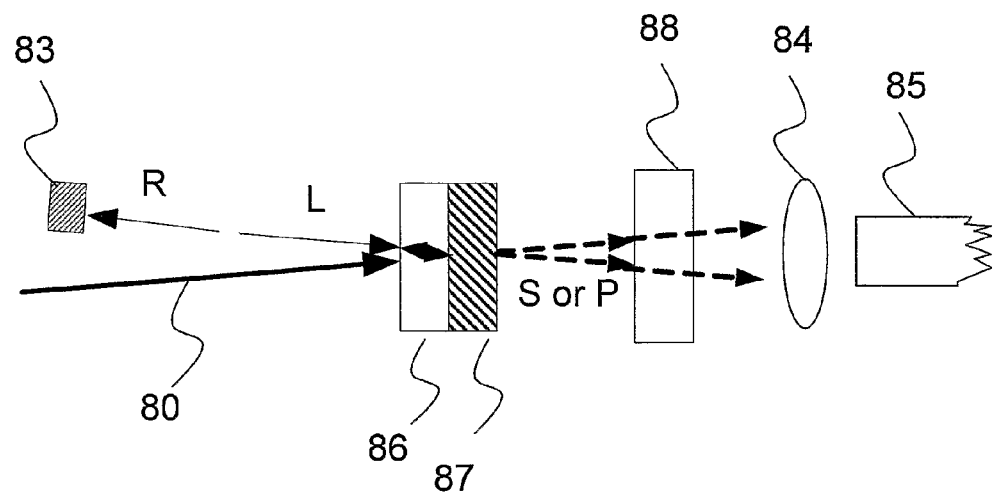
FIG. 8 shows schematically another polarization insensitive tuned filter, using a PBSCP/AQWP combination, according to a further preferred embodiment of the present invention.
Figure 9:
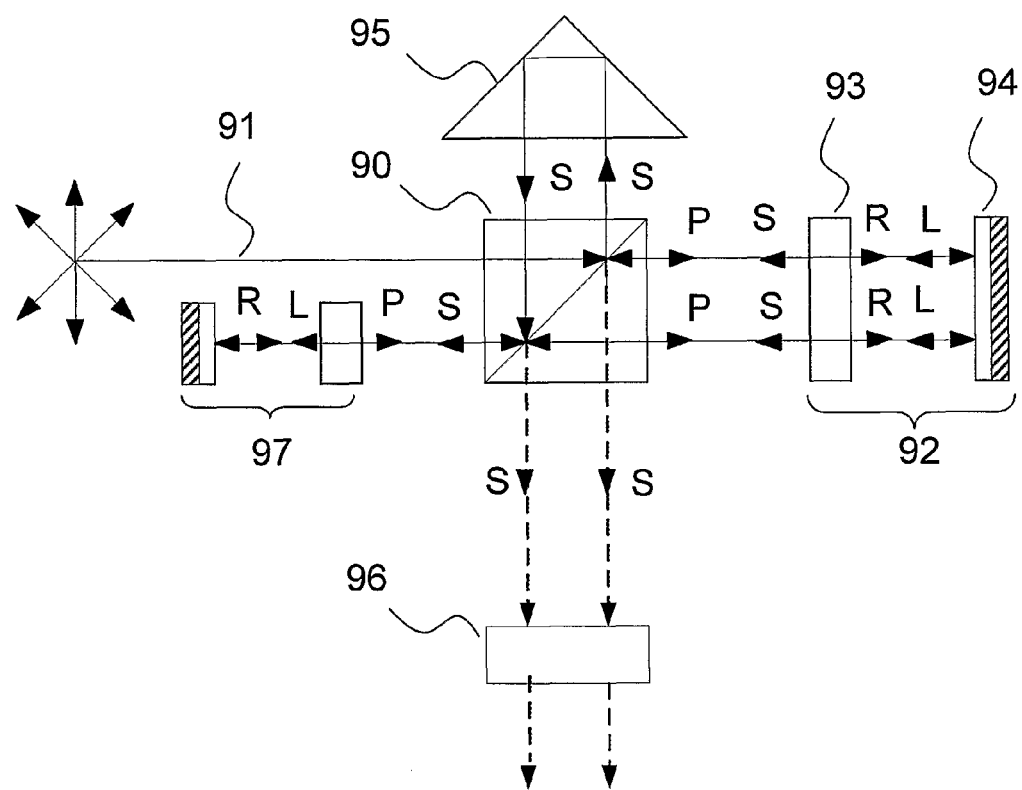
FIG. 9 shows schematically another embodiment of a polarization insensitive tuned filter, utilizing a conventional polarization beam splitter preferably of cube construction.

Reference is now made to FIGS. 7, 8 and 9, which illustrate preferred embodiments of the present invention, for a polarization insensitive tunable filter (PITF) with broadband, arbitrary-to-linear polarization conversion, using a combination of nano-polarizers and achromatic quarter waveplates (AQWP's). Such an arrangement provides for improved light throughput of liquid crystal tunable filters (LCTF's) when compared to the prior art. This arises because the arbitrary-to-linear polarization conversion utilized in the present invention results in throughput of both polarization components of the input beam, unlike prior art filter devices, which block one polarization component.

In the drawings of the various embodiments following which include liquid crystals as the birefringent element, only the LC layer itself is usually shown, but it is to be understood that the LC cell in general also has transparent electric field application electrodes, and preferably also other LC-associated elements, such as alignment layers, and anti-reflection coatings on the external surfaces to minimize insertion losses, all of which are well known in the art, and are not therefore shown in the drawings.

The polarization conversion can be understood using three main concepts:

(a) The nano-polarizers operate as reflection polarizers or polarized beam splitters, such as wire grid polarization beam splitters (WGPBS);

(b) R-polarized light is converted into P polarization upon passage through a QWP, if it is aligned such that the plane of the incident light makes a 45° angle with the optic axis, and vise versa, and similarly L-polarized light is converted to S polarization and vise versa; and (c) a combination of an AQWP and a mirror acts as a half wave plate, reversing the rotation direction of circularly polarized light.

The embodiments of FIGS. 7, 8 and 9, and other embodiments of this application, preferably utilize a number of planar components which are known in the art, as follows:

1. Sub-wavelength thin metallic gratings: Such gratings are used as wire grid reflection polarizers, or wire grid polarization beam splitters (WGPBS) and are available from several sources including Nano-Opto Inc., of Somerset, N.J., USA and Moxtek Inc., of North Orem, Utah, USA. They transmit the TM wave (electric field perpendicular to the grating vector) and reflect the TE wave. The gratings have a period of the order of less than 100 nm and their thickness is generally less than 300 nm. They are typically formed on glass or semiconductor substrates coated with thin film dielectric layers, and for the purpose of reducing the undesired reflection of the TM wave (antireflection coating).

Figure 6A:
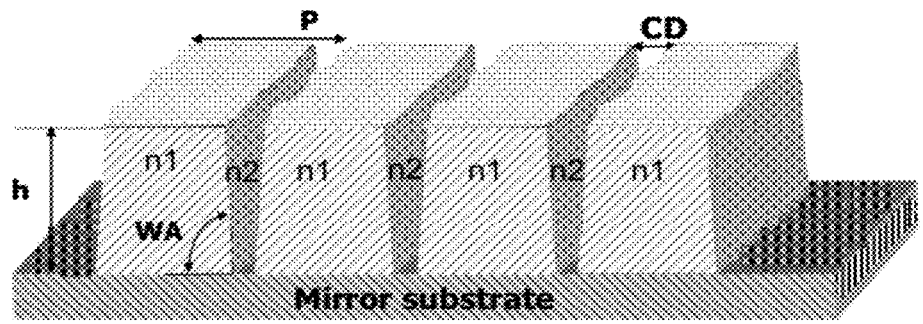
FIGS. 6A to 6D show a number of prior art planar components which are advantageously used in the various filter embodiments of the present invention.
Figure 6B:
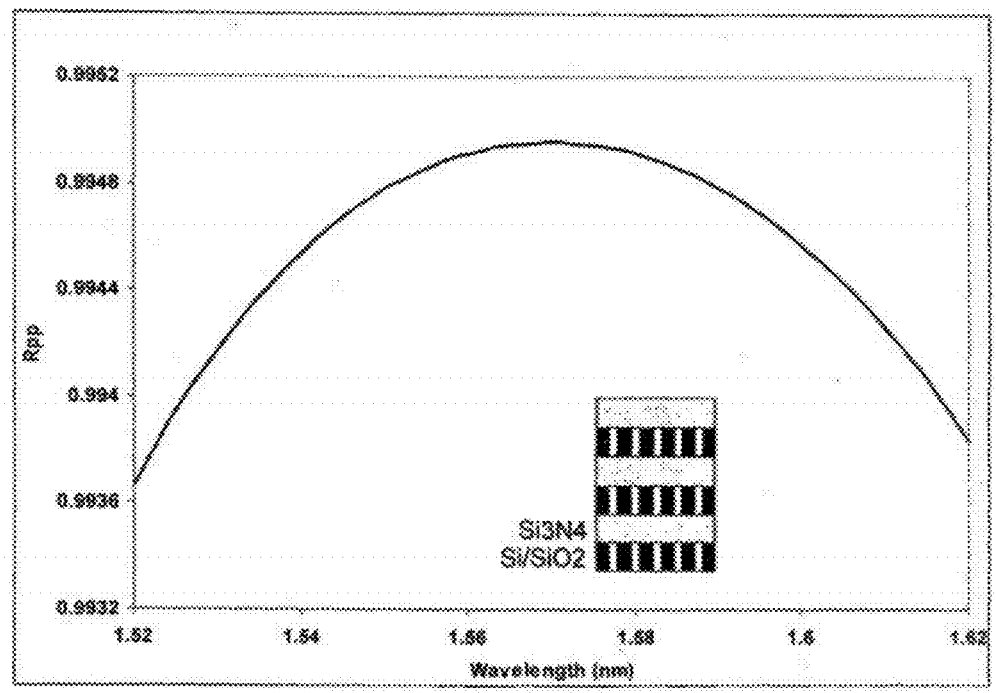

2. Alternating isotropic and birefringent thin film planar polarized beam splitters: Such PBS's are supplied commercially by the 3M Company, of St. Paul, Minn., USA. They are made of an alternating stack of transparent dielectric layers. One type of the dielectric layers is isotropic having refractive index $n_1$ while the other layer is birefringent with two indices $n_o$ and $n_e$. The index $n_1$-$n_o$ is such that for the wave polarized along the O axis, there is index matching and so the majority of the O wave is transmitted, while for the e-wave, the structure is periodic and so under certain conditions, incident light is totally reflected over a wide band and a wide angular range. The birefringent layer can be made of a sub-wavelength dielectric grating structure, which posses large form birefringence. Such a structure is shown in FIG. 6B, which also shows the normal reflectivity of one design of PBS using a stack of grating layer made of Si/SiO2 lines (300 nm pitch) and isotropic layers of $Si_3N_4$. For 45 degree incidence, the result is similar with the layers thicknesses normalized by cos 45.

Figure 6C:
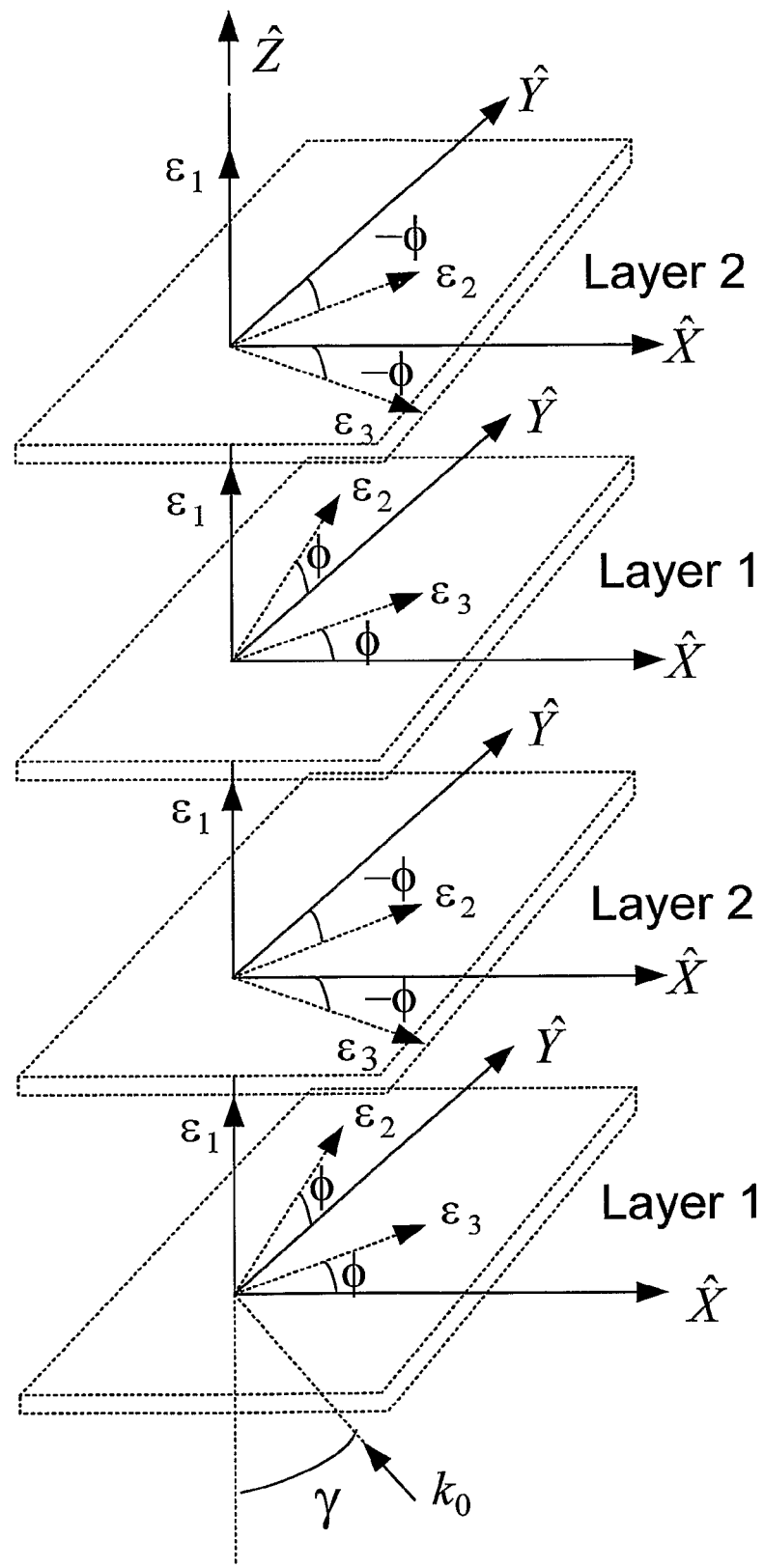

3. Omnidirectional Mirrors: These mirrors are made of a periodic thin film stack of alternating layers having a refractive index ratio larger than 2.2 and layer thickness of about a quarter wave. ODR mirrors are made from transparent dielectrics and therefore in contrast to metallic mirrors they exhibit nearly perfect reflectivity (>99.999%), hence they allow high throughput when used with Fabry-Perot tunable filters and other polarization conversion elements. FIG. 6C shows a schematic drawing of such an ODM, showing the anisotropic layer stack that can operate as omnidirectional mirror, and, near the edge of its photonic band gap, as a polarization conversion mirror. The structure parameters used in the example of FIG. 6C are a layer thickness to wavelength ratio of 0.13, and for the anisotropic layers having $\in_1=\in_2=(1.7)^2$ and $\in_3=(2.3)^2$ with their azimuth alternating between the two values: $\pm45°$.

Figure 6D:
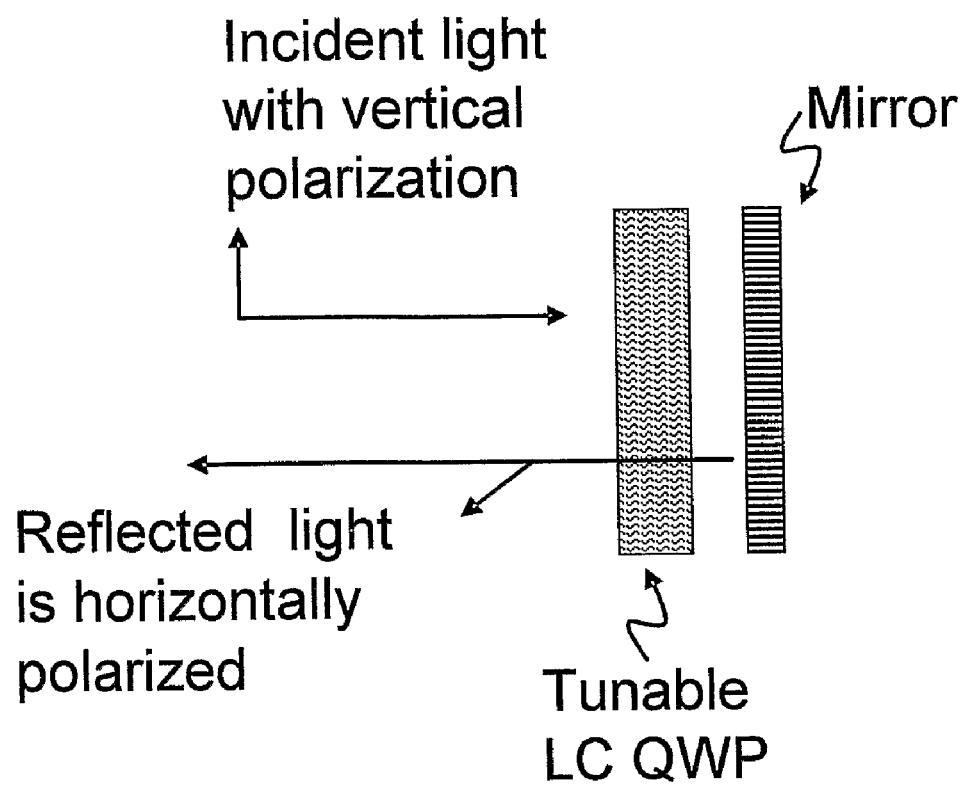

4. Polarization conversion mirrors (PCM's): These mirrors may be constructed of an alternating stack of birefringent layers, as described in the article by the current inventor entitled "Omnidirectional reflection from periodic anisotropic stack," published in Opt. Comm., Vol. 174, pp. 43-50 (2000). Using the form birefringence of subwavelength dielectric gratings, such PCM's can be produced in thin film form. Another possibility is the use of subwavelength metallic gratings with their ridges slanted at 45 degs. In addition it is possible to use the polarization conversion selective reflection peak from helical chiral smectic liquid crystals at oblique incidence such as described in the article "Selective Reflection by Helicoidal Liquid Crystals: Results of an Exact Calculations using the 4×4 Characteristic Matrix Method", by the current inventor et al, published in J. de Phys., Vol. 46, p. 815 (1985). Such helical structures that exhibit this polarization conversion in the 1st order Bragg type reflection peaks can be produced from solid chiral sculptured thin films made of dielectric materials, by thin film deposition techniques at glazing incidence, while rotating the substrate during the deposition. Another PCM is a Faraday mirror in thin film form that rotates the plane of polarization by 45 degrees upon forward passage and by an additional 45 degrees upon reflection from a mirror, resulting in a total of 90 degrees polarization conversion, such as described in European Patent Application EP1326127 for "Faraday rotator using a diamond-like carbon thin film", to Sumitomo Electrical Industries; and by M. Laulajainen, et al., in the article "$Bi_xY_{3-x}Fe_5O_{12}$ thin films prepared by laser ablation for magneto-optical imaging of superconducting thin films", published in Journal of Magnetism and Magnetic Materials Vol. 279, Issues 2-3, August 2004, Pages 218-223. FIG. 6D may also represent a Faraday Cell implementation, where the element marked as "Tunable LC QWP" would be replaced by a Faradaty rotation cell. Another type of PCM uses reflection gratings such as those described by S. J. Elston, et. al., in the article, "Polarization conversion from diffraction gratings," Phys. Rev. B 44, 6393-6400 (1991); by I. R. Hooper and J. R. Sambles, in the article "Broadband polarization-converting mirror for the visible region of the spectrum," Opt. Lett. 27, 2152-2154 (2002); and by R. A. Watts and J. R. Sambles, in the article "Reflection grating as polarization converters," Opt. Commun. 140, 179-183 (1997).

5. Subwavelength dielectric grating: polarization conversion mirrors can be fabricated on a substrate from dielectric wire grids. An example of such a grating on a mirror substrate is shown in FIG. 6A. This subwavelength grating structure can act, in combination with the mirror substrate, as a polarization conversion mirror. In the example shown, the following design parameters are given: CD/P=0.8, thickness to wavelength ratio=1.48, pitch to wavelength ratio=0.39, n1=1, n2=1.97 and WA=90 degrees. Such a sub-wavelength dielectric structure acts as a negative uniaxial film, and can thus act as a birefringent waveplate. It can be made to be achromatic over a wide spectral range using the special dispersion behavior of the TE and TM eigen-waves, as known in the art. Such nano-structures can be readily fabricated on glass or on Si using current standard photolithography 65 nm technology or less.

6. Polarized beam splitters for circularly polarized light (PBSCP): These components can be achieved using the reflection properties of cholesteric and chiral smectic liquid crystals which reflect totally one circular polarization component that have the same helix handedness while transmitting the other. They can also be formed in the form of thin solid films, as sculptured thin films.

With reference to FIG. 7, arbitrary polarized light, 80 is incident at a small angle onto a stack of suitably aligned achromatic quarter wave-plates 81 (AQWP) and a wire grid PBS 82. The angular incidence is essential in order to generate polarization conversion, since if the beams are collinear, they cannot be so treated. Assuming that it is the P polarization that is transmitted through the WGPBS, then the S component is reflected from the WGPBS, and upon passage back through the AQWP, is converted to L polarization. Since the input beam 80 is aligned at a small incident angle to normal, the reflected L-polarization is also reflected at a slight angle to the input beam, and impinges normally onto a planar mirror 83. It is to be understood that in the filter embodiments described herewithin, a plain reflective surface such as that shown as the planar mirror 83, in FIG. 7, is generally called simply a mirror, and this terminology is meant to cover any sort of plain reflective surface when no other descriptive term is added to the word mirror. The mirror 83 is disposed at a distance from the AQWP, to maintain a small angle of incidence without interfering with the input beam elements. Upon reflection from the mirror 83, the L reverses its helicity and becomes right circularly polarized, R, which upon passage through the AQWP 81 again, is converted to P polarization, which this time is transmitted through the PBS. The combination of the AQWP 81 and the mirror 83 constitutes a polarization conversion mirror (PCM), which is operative, in this embodiment, to convert the S-polarization to P-polarization. The two beams thus now both have P-polarization, and are separated angularly by twice the incidence angle. After passage through the birefringent tuned filter, 88 (BTF), and since they are separated only angularly, and originate from the same point, the filtered output can be simply launched into an output fiber 84 using a lens 85.

A specific implementation of this embodiment could simply be achieved by constructing a suitable PBS using a metallic wire-grid grating on one side of a glass, quartz or silicon substrate, this acting as the PBS, and using it as a substrate on which to build the QWP. The AQWP can be single LC retarder, with thickness and birefringence selected to satisfy the QWP condition, and tunable so that it acts as a QWP for each center wavelength filtered by the LCTF. Such a tunable LC QWP is shown schematically in FIG. 6D. By applying a voltage to the LC, the effective birefringence changes, thus varying the QWP condition to be satisfied at different wavelength. When combined with a mirror this device acts as an achromatic polarization conversion mirror. Alternatively the AQWP can be made passive, using a combination of two or three retarders, or it can be made in thin film form using the form birefringence of sub-wavelength dielectric grating layers, as is known in the art. In comparison with prior art methods of polarization conversion, such as a walk-off birefringent crystal with a half wave plate over part of the exit face, the present invention generally has a cost and construction advantage. No birefringent crystal is needed, and the manufacture can be done by thin film methods, using, for instance, thin film deposited gratings, and a polymer layer in the AQWP, thus making the entire device very compact.

Reference is now made to FIG. 8, which shows schematically, another scheme for providing polarization insensitivity to the tuned filter. Instead of the AQWP/PBS combination used in the embodiment of FIG. 7, the embodiment of FIG. 8 uses a PBSCP/AQWP combination, i.e. a Polarized Beam Splitter for Circularly Polarized light (PBSCP) with an AQWP. Arbitrary polarized light, 80 is incident at a small angle onto the PBSCP 86. Such a PBSCP reflects one circular polarization and transmits the other. The PBSCP can be a cholesteric or chiral smectic liquid crystal, or a sculptured thin film, as is known in the art. Assuming that the L polarization is transmitted, then the R polarization is reflected by the PBSCP 86. Upon reflection by the mirror 83, the R-polarization beam becomes L, which is transmitted through the PBSCP 86. The beams, now both of L polarization, pass through the juxtaposed AQWP 87, from which they emerge both having linear polarization, either P- or S-depending on the AQWP alignment. After passage through the birefringent tuned filter, 88 (BTF), they can be simply launched into an output fiber 84 using a lens 85. Both the PBSCP and the AQWP can preferably be constructed in planar form on a single substrate, as described hereinabove.

Reference is now made to FIG. 9, which shows schematically, another scheme for providing conversion of arbitrary to linear polarization, using nano wire grid polarizers, achromatic wave plates and mirrors, to enable broad band, polarization independent operation of LC tunable filters.

The embodiment of FIG. 9 utilizes overall concepts similar to those of FIGS. 7 and 8, but a different geometry, resulting in different optical path layout. Use is made of a conventional polarization beam splitter 90 PBS, preferably a cube construction. The arbitrarily polarized input beam 91 is split by the PBS into its S- and P-components. The P-component is transmitted and impinges on a polarization conversion mirror (PCM) 92, preferably made up of an AQWP 93 and a mirror 94. The PCM converts the P-polarization to S-polarization. Explained in functional terms of the AQWP/mirror arrangement, the P-polarization is turned into circular polarization by the AQWP, its rotation direction is reversed by reflection in the mirror, and passage back through the AQWP turns it into S-polarization. This S-polarization beam is now again reflected in the PBS 90, towards the output port of the device, where the BTF 96 is preferably situated.

Returning now to the reflected S-component of the input beam, it is reflected towards a corner prism or a retroreflector 95, from which it is returned to the PBS 91, but displaced laterally from its input path to the retroreflector. At the PBS interface, it is reflected towards a second and complementary PCM, 97, again preferably made up of an AQWP 93 and a mirror 94. The S-polarization is returned as P-polarization, which passes through the PBS undiverted, and again impinges on the first PCM, 92, which reflects it as S-polarization. This S-polarized beam impinges onto the PBS 91, where it is reflected towards the BTF and the output. Thus, both of the output beams arrive at the BTF having the same linear polarization, S-polarization in the example shown.

The output of the embodiment of FIG. 9 is thus two displaced beams having the same polarization direction. Like the embodiments of FIGS. 7 and 8, the two output beams can be combined using a lens and launched into a polarization maintaining fiber, and then collimated and used as the input to the LCTF.

Figure 10A:
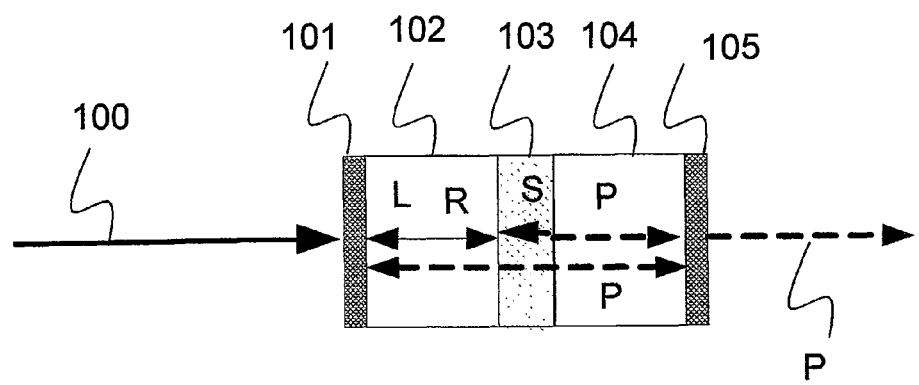
FIG. 10A shows schematically a birefringent, polarization-independent tunable Fabry-Perot filter, constructed and operative according to a further preferred embodiment of the present invention, using a mirror/AQWP/WGPBS/LC/mirror stack.
Figure 10B:
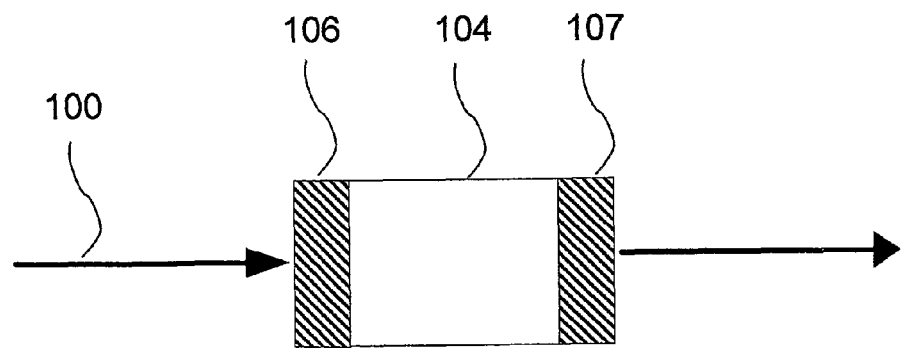
FIG. 10B is a schematic illustration of a further polarization insensitive F-P tunable filter, according to another preferred embodiment the present invention, using polarization conversion mirrors.
Figure 10C:
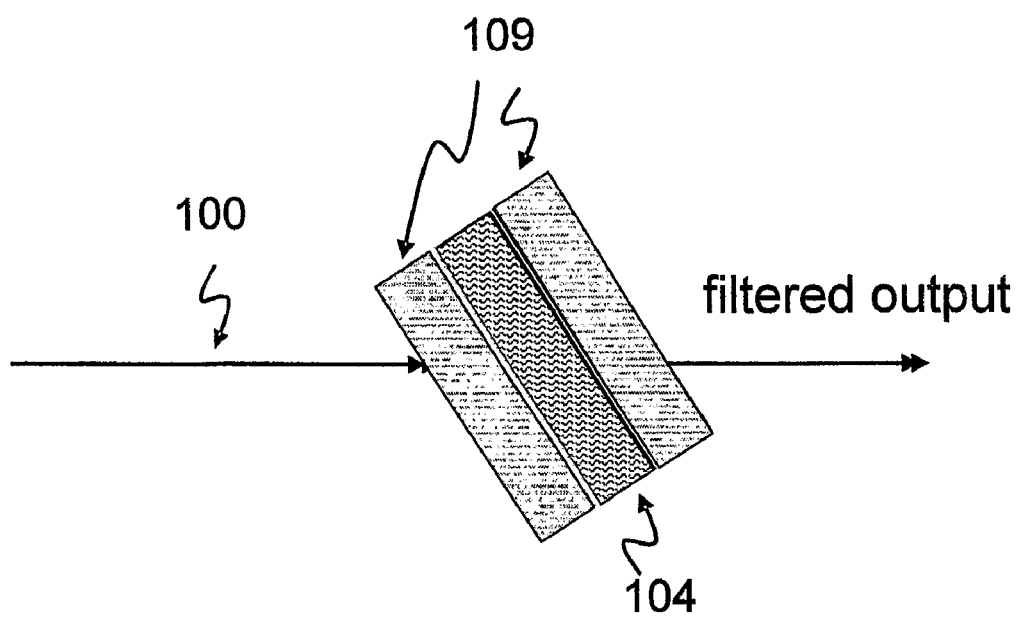
FIG. 10C illustrates schematically a further polarization insensitive F-P tunable filter, in which the PCM of FIG. 10B is based on the use of a helical chiral smectic liquid crystal structure, or a solid chiral sculptured thin film structure, at oblique incidence.

Reference is now made to FIGS. 10A to 10C, which are schematic illustrations of birefringent, polarization-independent tunable Fabry-Perot filters, constructed and operative according to further preferred embodiments of the present invention.

With reference first to FIG. 10A, the filter is constructed of a stack preferably comprising a mirror/AQWP/WGPBS/LC/mirror, shown as 101/102/103/104/105 in FIG. 10A. Although the filter is described as having a liquid crystal birefringent layer, this being an embodiment which is simple to construct and to tune, it is to be understood that the invention could be implemented using any other birefringent tunable layer. The filter tuning can preferably be done either using an electric field applied across the LC layer with electrodes, as is known in the art, and not shown in FIG. 10A, or by temperature tuning, by changing the temperature of the LC. Arbitrarily polarized light 100 is incident onto the stack. Assuming that the P polarization is transmitted through the PBS 103, then the S component is reflected, which upon passage back through the AQWP 102, is converted to left circularly polarized light (L). Upon reflection from the first planar mirror 101, the L-polarization reverses its helicity and becomes right R, which upon passage through the AQWP 102 again, is converted to P polarization. The combination of the AQWP 102 and the mirror 101 thus behaves as a linear polarization conversion mirror (PCM), converting the S-polarization to P-polarization, that is transmitted through the PBS 103. The P polarized light is modulated in its passage through the LC, is reflected back by the second mirror 105 of the Fabry-Perot cell, is transmitted again through the PBS 103 in the reverse direction (from right to left in the drawing), the P-polarization is converted to R-handed polarization by the AQWP 102, then to L-polarization by reflection in the first mirror 101, and then is converted to S-polarization by the AQWP 102. As in the first round of the description of operation, the S-polarization is reflected by the PBS 103, and undergoes a second cycle through the AQWP 102, mirror 101 and AQWP 102 to be converted to P-polarization, which is transmitted through the PBS 103 and is again modulated by the LC 104. The light thus executes multiple traverses of the F-P cell, and exits the F-P filter as P-polarized light in the preferred embodiment shown.

The phase buildup of the partial beams arriving at the second mirror 105 is given for the first wave by:

$$\phi_0 + \phi_{LC}$$

where $\phi_0$, $\phi_{LC}$ are the phases accumulated respectively by a single pass through the AQWP-PBS combination, and a single pass through the LC.

Similar expressions can be written for the further partial waves arriving at the second mirror 105, as follows:

$2^{nd}$ Round:

$$5\phi_0 + 3\phi_{LC};$$

3rd Round:

$$9\phi_0 + 5\phi_{LC} \text{ and}$$

nth Round:

$$(4n-3)\phi_0 + (2n-1)\phi_{LC} = -3\phi_0 - \phi_{LC} + 2n(2\phi_0 + \phi_{LC}).$$

Summation over all the partial waves leads to the following expression for amplitude transmittance:

$$t = \frac{t_m^2}{1 - r_m^2 \exp(i\delta)} \exp(-i(3\varphi_0 - \varphi_{LC})) \qquad (8)$$

where $r_m$, $t_m$ are respectively the amplitude reflectance and transmittance of the mirrors 101, 105. Hence the transmittance may be written as:

$$T = \frac{1}{1 + F \sin^2(2\varphi_0 + \varphi_{LC})} \qquad (9)$$

where F is the finesse. Hence the system acts in a similar manner to a standard Fabry-Perot filter, with a constant phase shift coming from the mirrors or from the AQWP/PBS combination. Transmittance maxima will occur when the following condition is satisfied:

$$\phi_{LC} = m\pi - 2\phi_0,$$

where m is an integer.

The filter of this embodiment has the advantage of being planar, and readily fabricated using conventional silicon technology. This enables use of conventional lithography and thin film deposition processes for the production of subwavelength dielectric grating (SWG) structures, for instance, to be used as the AQWP and as the PBS, in addition to standard mirror coatings. According to another preferred embodiment of this invention, an LC-tunable QWP can be used, in which the voltage applied across the LC of the QWP is adjusted so that the quarter wave properties of the QWP track the wavelength, leading to a broader spectral range. Alternatively, the AQWP can be achromatic and passive and made up preferably of two to three retarders.

Reference is now made to FIG. 10B, which is a schematic view of a further polarization insensitive F-P tunable filter, constructed and operative according to another preferred embodiment the present invention. This filter comprises a liquid crystal (LC) layer 104 sandwiched between two polarization conversion mirrors PCM1, 106, and PCM2, 107, which convert P to S polarization, and S to P upon reflection. The LC cell has transparent electric field application electrodes, as is known in the art, and also preferably other LC-associated elements, such as alignment layers, and anti-reflection coatings on the external surfaces to minimize insertion losses, all of which are known in the art and are not shown in FIG. 10B. Arbitrarily polarized incident light 100 can be decomposed into P and S components. Assuming that the P component lies along the e-axis, then upon reflection from PCM2 it is converted into S, and S incident on it is converted into P. The end result is that both the P and S waves undergo the same phase changes and their transmission peaks will coincide. Such a PCM can preferably be constructed in thin film form using a stack of anisotropic birefringent layers that can be made using the form birefringence of subwavelength dielectric gratings (SWDG), such as described in the article by the inventor of the present invention, entitled "Omnidirectional reflection from periodic anisotropic stack", published in Opt. Comm , Vol. 174, pp. 43-50 (2000). Other suitable designs for PCM's for use in this embodiment include metallic wire grids, as described hereinabove.

Reference is now made to FIG. 10C, which illustrates schematically a further suitable design in which the PCM is based on the use of a helical chiral smectic liquid crystal structure, or a solid chiral sculptured thin film structure, at oblique incidence, as described hereinabove, and in the above referenced article having the inventor of the present invention as one of the authors. The tunable birefringent layer 104 is sandwiched between the two chiral layers 109, and the entire F-P cavity is aligned at the oblique angle to the incident arbitrarily polarized light 100.

Figure 10D:
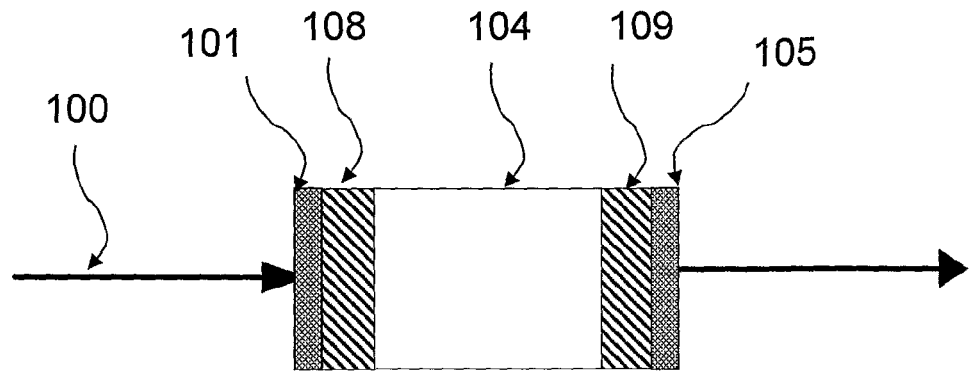
FIG. 10D illustrates schematically a preferred embodiment of the polarization insensitive LC F-P filter of FIG. 10B, using a thin film stack having a Mirror/SWDG-AQWP/LC/SWDG-AQWP/Mirror structure.

Reference is now made to FIG. 10D, which illustrates schematically a particular embodiment of the polarization insensitive LC F-P filter of FIG. 10B. This embodiment comprises a thin film stack having a Mirror/SWDG-AQWP/LC/SWDG-AQWP/Mirror structure, with the two SWDG-AQWP's aligned orthogonally, and each at 45° to the optic axis of the LC. The use of integrated thin film sub-wavelength dielectric gratings is advantageous, since the device is thus more compact than devices using discrete components. Unpolarized light 100 impinging on the device from the left side can be considered as composed of two polarizations, the left L and the right R polarizations. Assuming the first SWDG-AQWP 108 is oriented such that the R-polarization is converted to P polarization. Then L polarization is converted to S. If the LC molecules are oriented such that P is the extraordinary wave, then S is the ordinary wave. Upon transmission through the second SWDG-AQWP 109, reflection by the second mirror 105 and back through the second SWDG-AQWP 109 results in the polarizations conversions P→S and S→P. Hence after a double pass through the device, the two polarization components accumulate the same phase change. The result is that the transmission peaks corresponding to the Fabry-Perot resonances are obtained at the same location for the two polarization components, hence the polarization independence.

Figure 11:
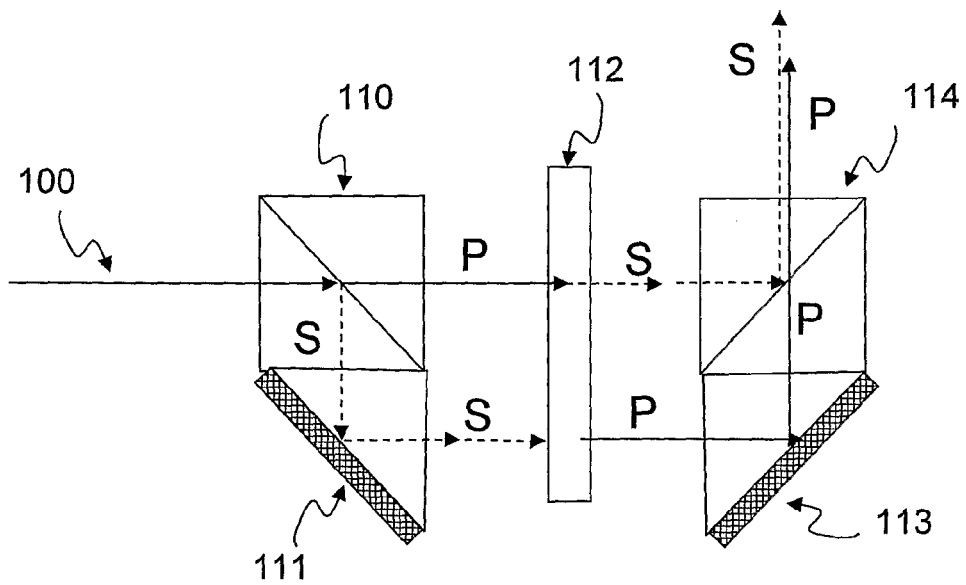
FIG. 11 is a schematic illustration of a further preferred embodiments of the present invention, using a folded Solc filter without its input and output polarization conversion elements.
Figure 12A:
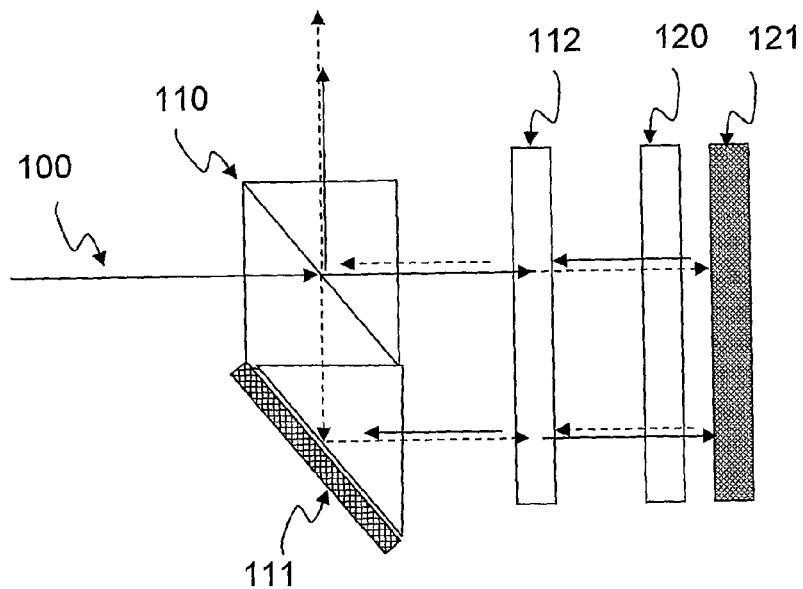
FIGS. 12A and 12B are schematic illustrations of reflection embodiment of FoS filters of the embodiment shown in FIG. 11.
Figure 12B:
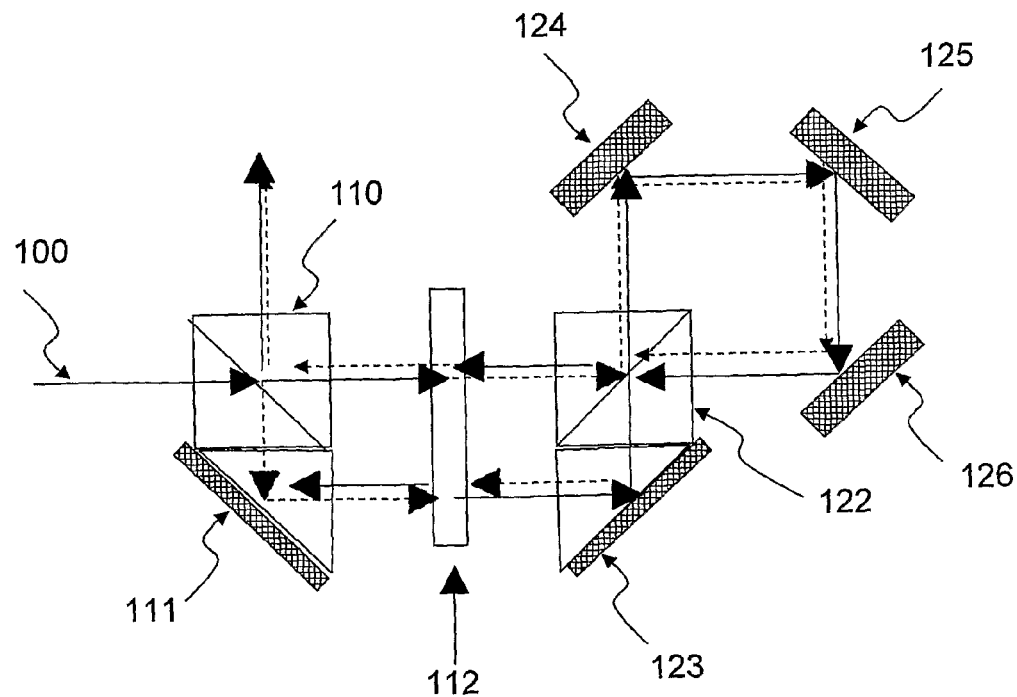

Reference is now made to FIGS. 11, 12A and 12B which illustrate schematically novel configurations, according to further preferred embodiments of the present invention, using folded Solc (FoS) filters without the input and output polarization conversion elements, to achieve both polarization independence and higher optical throughput than conventional FoS filters. It is to be understood that in the following embodiments, references to the FoS, FaS, or L-O array are understood to refer to the stack of retarder plates, without the associated input and output polarizers. Furthermore, it is to be understood that the filters described can be provided as tunable filters by use of a liquid crystal material for the retarder plates, or another suitable birefringent material, whose birefringence can be controlled by means of externally applied conditions, such as electric field, magnetic field or temperature.

FIG. 11 shows a schematic illustration of a transmission embodiment of this type of filter. The arbitrarily polarized input beam 100 is spatially split into its two separate polarization components, P and S, by use of a conventional polarizing beam splitter PBS 110 and mirror 111. In FIG. 11, for clarity, the P-polarization is shown as a full line, and the S-polarization as a dashed line. Each of these separate polarizations is then passed through separate regions of a folded Solc filter stack 112, such that the same filtering operation providing output for the tuned wavelength only, is applied to each component. Each component is thus transmitted with the same wavelength peak, such that use is made of both polarization components. During passage through the FoS filter, the input beams undergo polarization conversion, such that the P-polarization input exits as S-polarization, and the S as P. These two spatially separated, filtered output beams are then recombined to a single beam having generally the same arbitrary polarization as the input beam, by means of an output folding mirror 113 and a polarized beam splitter 114 operating as a beam combiner. Unlike the conventional FoS filter, which, by virtue of its polarizer at the input, uses only one component of the polarization of the incident beam, this embodiment uses all components of the input beam, and the transmission is therefore substantially higher than that of a conventional FoS filter.

FIG. 12A shows a schematic illustration of a reflection embodiment of this type of FoS filter. The benefit from reflection-mode operation is that the number of retarders required is reduced by a factor of $\sqrt{2}$ or 2 depending on the configuration used. Another benefit of the reflection mode operation is the reduction in the height of the side lobes.

In the preferred embodiment of FIG. 12A, the input components are identical to those of the transmission embodiment of FIG. 11, and comprise a conventional polarizing beam splitter PBS 110 and mirror 111, and a tunable folded Solc filter stack 112 without the conventional input and output polarizing elements. However, in the reflective embodiment, instead of exiting the device through a mirror and PBS combination as in the embodiment of FIG. 11, the P and S components from the folded Solc stack 112 are impinged onto a polarization conversion mirror (PCM), such as an achromatic quarter waveplate 120 in conjunction with a mirror 121. Upon reflection, the P-polarization is converted to S-polarization, and the S to P. The two components then pass again back through the folded Solc stack 112 and are recombined again using the mirror 111 and input polarized beam splitter 110, which, on output, behaves as a polarized beam combiner. In this manner, the number of plates in the FoS array will be reduced by a factor of two when compared with a transmissive FoS filter, such as that of FIG. 11, of the same throughput and finesse.

Reference is now made to FIG. 12B which illustrates schematically a polarization independent filter, constructed and operative according to a further preferred embodiment of the present invention, using a folded Solc filter stack 112 in reflection mode, but without the need for polarization conversion for the return path. Instead of the PCM arrangement used for returning the beam back through the FoS array in the embodiment of FIG. 12A, the preferred embodiment of FIG. 12B uses an additional PBS 122 in conjunction with its own reflecting mirror 123, and three additional mirrors 123-126, to return the respective P- and S-components through the FoS stack, but with reversed positions. The operation is as follows. Taking first the upper path in the drawing of FIG. 12B, the S-polarization exiting the FoS stack 112 is reflected by the PBS 122, and then again by the mirrors 124, 125, 126 so that it re-enters the PBS 122. Here, being of S-polarization, it is again reflected by the PBS 122 to the PBS's associated mirror 123, from which it is reflected back into the FoS array 112 along the upper path, i.e. along the path where the P-polarization component exited the FoS array. The P-polarization component exiting the FoS array 112 from the bottom part of the array, follows an identical path round the mirror path but in the reverse direction, being reflected by the PBS associated mirror 123, transmitted straight through the PBS 122, and reflected by the path mirrors 124, 125 and 125, to re-enter the PBS 122, which it again traverses without reflection, and returns along the top path through the FoS 112, which was used by the S-polarization during the input leg of the optical path.

This embodiment thus has a common optical path arrangement, similar to the Sagnac type interferometer set-up, whereby the P- and the S-components travel the same optical path lengths, but in a manner which causes exchange of their mutual positions, such that along the path through the FoS array occupied by the incident P-polarization, an S-polarization beam returns, and vice versa for the path of the input S-polarization. Thus, the effect of polarization conversion on reflection is simulated. Comparing the optical paths of the embodiment of FIG. 12A with that of FIG. 12B, it is observed that in FIG. 12A, the optical path length of the input S-component split at the PBS 110, is longer than that of the input P-polarization component, by an amount equal to the additional path length through the PBS 110 to the input mirror 111, and likewise for the output P-polarization component. In FIG. 12B, on the other hand, both P- and S-components traverse exactly the same optical path length.

Since the FoS array is an birefringent polarization interference filter, the wavelength of the transmission peak is generally different for the P and S polarization components traversing the FoS array having a specific configuration and operating conditions. However, in the case of the embodiment of FIG. 12B, since the two components traverse exactly the same optical path through the device, and more specifically, through the FoS array, exactly the same wavelength transmission peak is obtained for the transmission modes of both components. Thus, the filter operates at exactly the same wavelength for both components, instead of at different wavelengths if different paths or conditions through the FoS were present. This effect of ensuring that the transmission peaks through the device fall at identical wavelengths for both polarization components is a key to the polarization insensitive operation of all of the embodiments of the present invention.

The use of a common optical path has the additional advantage of avoiding oscillatory noise due to fluctuations in the path length difference, a known drawback in non-common path interferometry.

Figure 13:
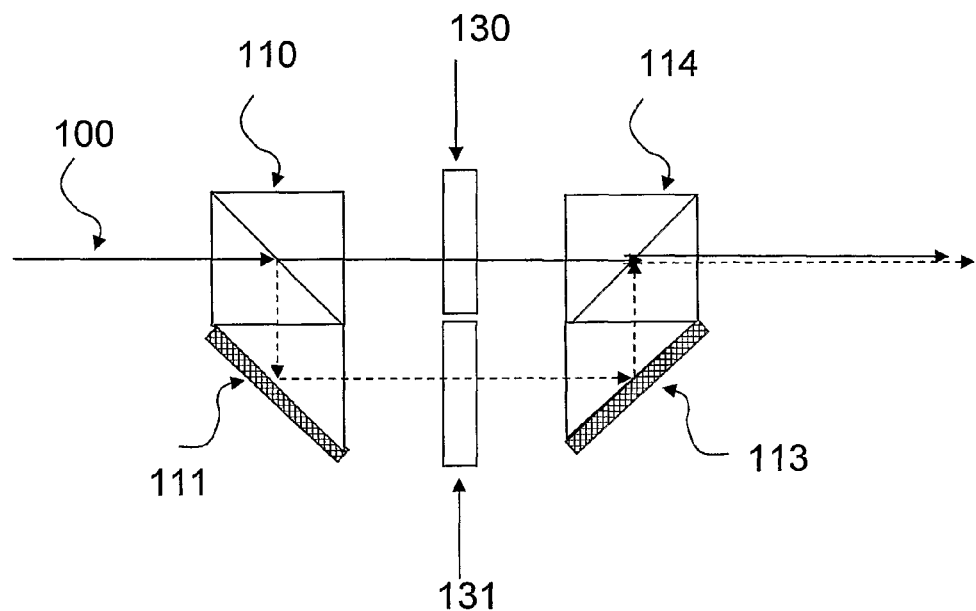
FIG. 13 illustrates schematically a polarization independent filter, according to a further preferred embodiment of the present invention, using a pixilated or doubled fan Solc filter array or Lyot-Ohmann filter array for the tuning element.
Figure 14:
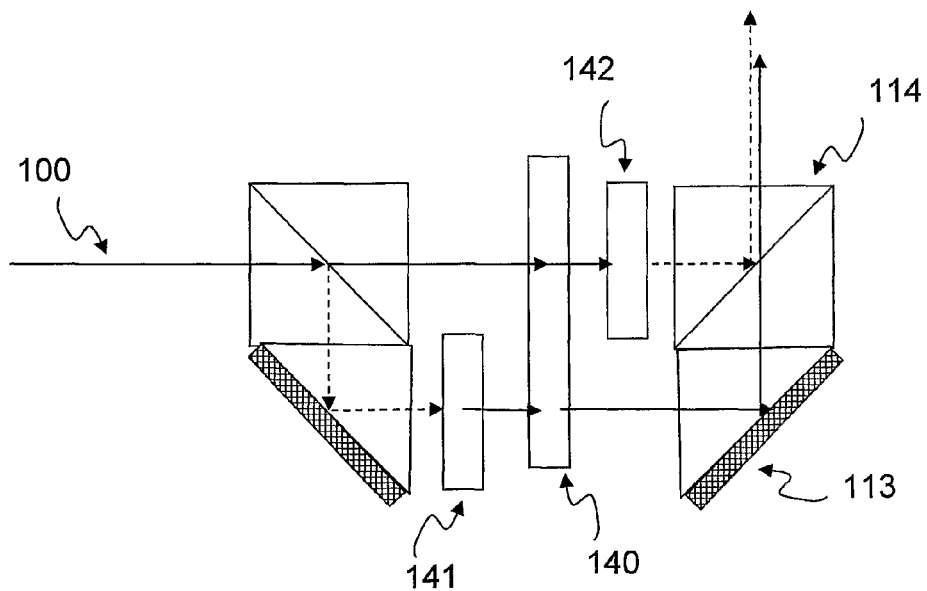
FIG. 14 illustrates schematically a second preferred embodiment for using a fan Solc filter array or a Lyot-Ohmann filter array without the need for pixellation or doubling of the array.

Reference is now made to FIGS. 13 and 14, which illustrate schematically polarization independent filters, constructed and operative according to further preferred embodiments of the present invention, using either a fan Solc (FaS) filter array or a Lyot-Ohman (L-O) filter array. In the cases of these two filter configurations, there is no polarization conversion and therefore the configurations described in the embodiments of FIGS. 11, 12A and 12B are not suitable. Two possible structures are thus proposed in order to construct a polarization insensitive FaS or L-O filter.

Referring to FIG. 13, which is a first preferred embodiment for achieving this object, instead of a single filter stack to operate on the input beam, two different filter stacks without their external polarizing elements are used, each being oriented such that one acts as the filter for the P component and the other for the S-component. Instead of physically separate stacks, the invention can also be implemented by using a single stack, but with its birefringent elements divided into two pixels. By this means, the general arrangement of the embodiment of FIG. 11 can be used for the FaS and L-O filters, using the modifications shown in FIG. 13. In FIG. 13, the input components are identical to those of the embodiment of FIG. 11, whereby the arbitrarily polarized input beam 101 is spatially split into its two separate polarization components, P and S, by use of a conventional polarizing beam splitter PBS 110 and associated mirror 111. Each of these separate polarizations is then passed through separate filter stacks, whether FaS or L-O configurations, with the filter stack in each path being oriented correctly for the polarization in that path. Thus, the upper path in the drawing of FIG. 13, has its array 130 aligned for correct filtering of a P-polarized beam, while the lower path has its array 131 aligned for correct filtering of an S-polarized beam. The conditions applied to each of the filters are such that the output peak is at the same wavelength, such that the transmission peaks of both components coincide. These two spatially separated, filtered output beams are then recombined to a single beam having generally the same arbitrary polarization as the input beam, by means of an output folding mirror 113 and a polarized beam splitter 114 operating as a beam combiner. However, since during passage through the FaS or L-O filter arrays, the beams did not undergo polarization conversion, the P-polarization input exiting as P-polarization, and the S as S, in the embodiment of FIG. 13, the combined beam exits the beam combiner 114 in the same direction as entry direction of the P and S-components, unlike FIG. 11.

Reference is now made to FIG. 14, which illustrates schematically a second preferred embodiment for achieving this objective of a polarization independent filter using either a fan Solc (FaS) filter array or a Lyot-Ohman (L-O) filter array. In the embodiment of FIG. 14, a single filter stack is used, such that the same polarization has to be used through both parts of the stack. Therefore, after the generation of the polarity diversity in the input PBS 110 and mirror 111, an achromatic half wave plate HWP or 90° polarization rotator, such as a 90° twisted nematic liquid crystal element, is inserted into the path of one of the polarization components, which, in the example shown in FIG. 14 is the S-component, to convert it to P-polarization, such that both inputs to the filter stack are P-polarization. On the output side, after both of the component beams exit the filter stack, both having P-polarization, another achromatic HWP or 90° rotator 142 is disposed in the path of the beam component which was not polarization converted on the input side, in the example of FIG. 14, the top path, to convert it into S-polarization. This is combined with the P-polarization exiting from the bottom part of the filter array, in the mirror 113 and PBS beam combiner 114 arrangement, to generate the output filtered beam. The reason for inserting the output HWP or 90° rotator 142 in the opposite path to that of the input HWP or 90° rotator 141 is to maintain optical symmetry in the device. However, the device will also operate with both the input and the output HWP's in the same optical path.

The above configurations are not limited to the basic configurations of LCTFs such as FaS, FoS, L-O or F-P filters, but also modifications on these filters are possible, as is known in the art, such as the addition of two filters in tandem, which provides narrower peaks than a single filter, the addition of a retarder to each stage of the L-O filter and combination of each filter with a tunable etalon made of the same material, this too providing narrower peaks. All the concepts that are meant to decrease the number of plates and improve the FWHM of the filter line can be combined with the proposed concepts to yield larger light throughput as well.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A polarization independent tunable optical filter comprising:
   first and second anisotropic periodic structures aligned to form a Fabry-Perot cavity between them; and
   a tunable birefringent liquid crystal layer disposed between said anisotropic periodic structures,
   wherein said first anisotropic periodic structure reflects incident light of a first linear polarization direction as light converted to a second linear polarization direction essentially perpendicular to said first linear polarization direction, and said second anisotropic periodic structure reflects incident light of said second linear polarization direction as light converted to said first linear polarization direction.

2. A filter according to claim 1 and wherein said anisotropic periodic stratified structures comprise thin film structures of one layer or more.

3. A filter according to claim 1, wherein at least one of said anisotropic periodic structures comprises a stack of anisotropic birefringent layers based on the form birefringence of subwavelength dielectric gratings.

4. A filter according to claim 1, wherein at least one of said anisotropic periodic stratified structures comprises a helical chiral smectic liquid crystal structure aligned such that said light impinges thereon at an oblique angle, such that the reflection therefrom is at the first order reflection peak.

5. A filter according to claim 1, wherein at least one of said anisotropic periodic stratified structures comprises a solid helical chiral sculptured thin film structure aligned such that said light impinges thereon at an oblique angle, such that the reflection therefrom is at the first order reflection peak.

6. A polarization independent tunable optical filter comprising:
   first and second arrays of subwavelength gratings aligned to form a Fabry-Perot cavity between them; and
   a tunable birefringent liquid crystal layer disposed between said arrays of subwavelength gratings,
   wherein said first array of subwavelength grating reflects incident light of a first linear polarization direction as light converted to a second linear polarization direction essentially perpendicular to said first linear polarization direction, and said second array of subwavelength grating reflects incident light of said second linear polarization direction as light converted to said first linear polarization direction.

7. A filter according to claim 6, wherein at least one of said arrays of subwavelength gratings made from metal and has Gaussian-type line profile with ridges slanted at 45 degrees with respect to the polarization axis of normally incident light.

8. A filter according to claim 6, wherein at least one of said arrays of subwavelength gratings is deposited on a mirror and has effective form birefringence $\Delta n_{\mathit{eff}}$ and height h satisfying the condition $\Delta n_{\mathit{eff}} = \lambda/4h$, where $\lambda$ is the central wavelength of the range of operation.

9. A filter according to claim 6, wherein at least one of said arrays of subwavelength gratings is deposited on a mirror and has form birefringence dispersion that allows achromatic operation over a wide spectral range.

* * * * *